Figure 1:
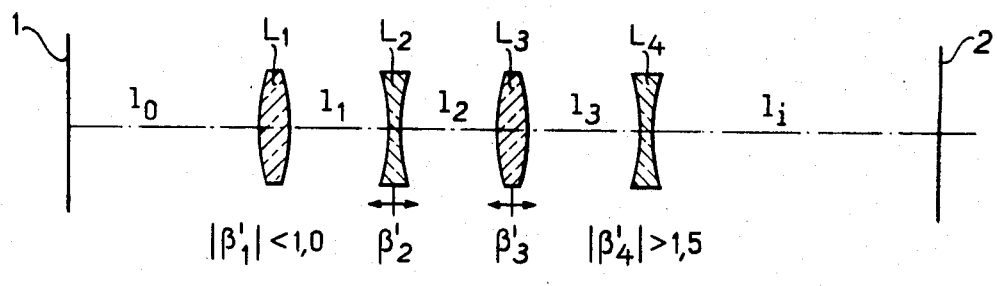

United States
Klein

[15] 3,679,286
[45] July 25, 1972

[54] ZOOM LENS OBJECTIVE FOR STEREOSCOPIC VISION MICROSCOPES

[72] Inventor: Walter Klein, Auf Hohl 36, 6301 Wissmar, Germany

[22] Filed: Jan. 19, 1970

[21] Appl. No.: 3,849

Related U.S. Application Data

[63] Continuation-in-part of Ser. Nos. 377,913, June 25, 1964, abandoned, and Ser. No. 769,442, Oct. 21, 1968, abandoned.

[30] Foreign Application Priority Data

July 6, 1963 Germany..............................L 45 284

[52] U.S. Cl.................................350/184, 350/36, 350/145, 350/220
[51] Int. Cl......................................G02b 15/16, G02b 21/22
[58] Field of Search....................350/184, 186, 187, 40–44

[56] References Cited

UNITED STATES PATENTS

| 2,235,364 | 3/1941 | Gramatzki | 350/184 |
| 3,057,259 | 10/1962 | Schuma | 350/43 X |

FOREIGN PATENTS OR APPLICATIONS

| 622,046 | 1/1938 | Germany | 350/184 |
| 1,310,943 | 10/1962 | France | 350/184 |

*Primary Examiner*—John K. Corbin
*Attorney*—Gerard J. Weiser

[57] ABSTRACT

The invention is a low-power zoom lens system for a stereoscopic vision microscope characterized by an objective having four lens members, the first and the fourth lens members being fixedly mounted, and the second and third lens members being mounted between the first and fourth lens members for movement relative to each other. The pupil is positioned within the objective. The absolute magnifying power of the first lens member is less than 1.0 and that of the fourth lens member is greater than 1.5. Preferably, the ratio of the absolute focal length of the third to the second lens member is greater than 1.3.

3 Claims, 6 Drawing Figures

ZOOM LENS OBJECTIVE FOR STEREOSCOPIC VISION MICROSCOPES

This application is a continuation-in-part application of applications Ser. Nos. 377,913 and 769,442, filed 25 June 1964 and 21 Oct. 1968, respectively, now abandoned.

The present invention relates to low-power zoom lens systems, and more particularly to such systems used in binocular microscopes adapted for stereoscopic viewing of objects and in binocular magnifiers.

It is well known to vary focal length of objective lenses continuously by relatively moving the lens members of the objective. Two fundamentally different constructions have been used for this purpose. In one embodiment, one lens member is linearly moved while the other lens member is arcuately moved by a cam which generally effectuates a reversal of the direction of movement of the lens member. This so-called mechanical balancing or compensating is complex and accordingly expensive to produce because of the arcuate path control of one lens member. In the other design, known as the optical balancing or compensating system, the change in the focal length is produced by linearly moving at least two lens members which are fixedly coupled together.

It has also been proposed to change the focal length of objectives by mounting two objective lens members for movement relative to each other, both lens members being moved on both sides of the position in which the lens members have the magnifying power 1. In this design, the mechanical and the optical balancing or compensating means of the two constructions are used.

If an objective with variable focal length is to be used in a microscope, particularly in stereoscopic vision microscopes, additional difficulties arise from the requirement to make the aperture and the fields of view as large as possible. However, the free diameters of the lens members facing the object in binocular microscopes must be small unless the distance from the eye is very great and the magnification is correspondingly low. But the free diameters of the lenses at the side of the image also must be chosen within limits so that the free light paths in the subsequent prisms and mirror systems do not become too large. Otherwise, the instrument would become too big and unwieldly, and the manufacture of its components too difficult.

It is the primary object of the present invention to avoid these disadvantages of conventional objective lens systems by improving the type of zoom lens. The objective of the invention has four lens members, the first and the fourth lens members being fixedly mounted, and the second and third lens members being mounted between the first and the fourth lens members for movement relative to each other, the pupil being positioned within the objective. In the system, according to the invention, the absolute magnifying power $\beta'_1$ of the first lens member is less than 1.0 and the absolute magnifying power $\beta'_4$ of the fourth lens member is greater than 1.5.

In a preferred embodiment, the ratio of the absolute focal length of the third lens member to that of the second lens member is greater than 1.3.

The objective of the invention comprises four lenses which are positioned in the following order from the object to the image plane: a first biconvex lens, a biconcave lens, a biconvex lens and a biconcave lens. The first biconvex lens and the second biconcave lens are fixedly mounted, the first biconcave lens and the second biconvex lens, which are positioned intermediate to the two fixedly mounted lenses are capable of displacement relative to each other. The two lenses, which have a negative and positive refractive power respectively, are displaced both for such distance and direction, and positioned at a distance from each other and from the two fixedly mounted lenses to maintain a magnification ratio of the object to image of 1 to 1. The intermediate image formed by the two lenses is always in a 1 to 1 relationship with respect to the object. In the microscope objective, the distance between the object and its image remains essentially constant, and the absolute focal length of the negative and positive lenses are different from each other. In the present system, the object positioned at a finite distance forms an image at a finite distance.

Figure 2:
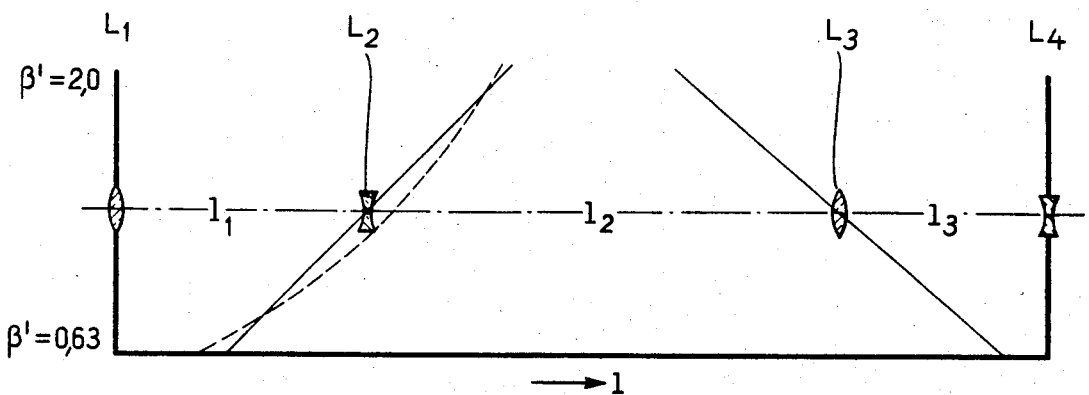
Figure 3:
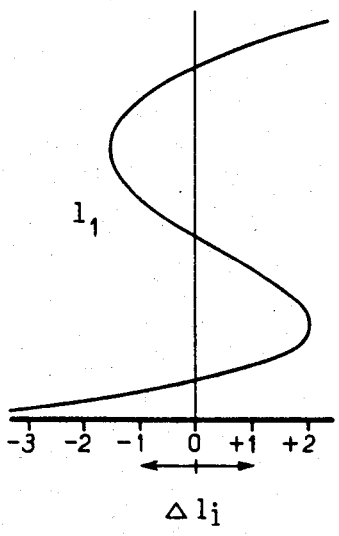
Figure 4A:
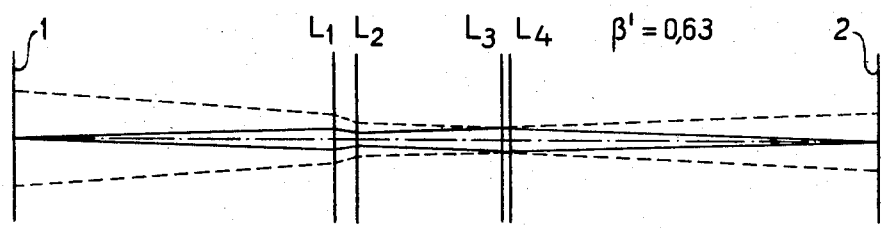
Figure 4B:
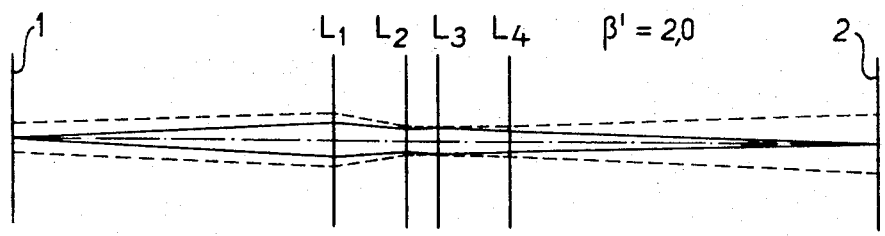

The above and other objects and features of the invention will become more apparent from the following detailed description of certain preferred embodiments and the accompanying drawing wherein FIG. 1 is an illustration of a zoom lens objective according to the invention;

FIG. 2 illustrates the paths of movement of the second and third lens members of the objective, the full lines showing the relative adjustment of the lenses when both are linearly moved and the broken line showing the adjustment path of the second lens members when so-called mechanical balancing or compensation is used;

FIG. 3 illustrates the movement of the conjugate image plane in dependence on the movement of the second and third lens members when both lens members are linearly adjusted; and FIGS. 4a and 4b illustrate, at a scale of 1:2, the points where the light beams pass through the objective lenses of an objective having the characteristics set forth in Tables 1 and 2 hereinbelow, the full lines indicating the beam paths of the aperture beams and the broken lines showing the limits of the oblique beams, FIG. 4a showing an objective with a total magnification $\beta' = 0.63$ and FIG. 4b showing such an objective with a total magnification of $\beta' = 2.0$.

Figure 5:
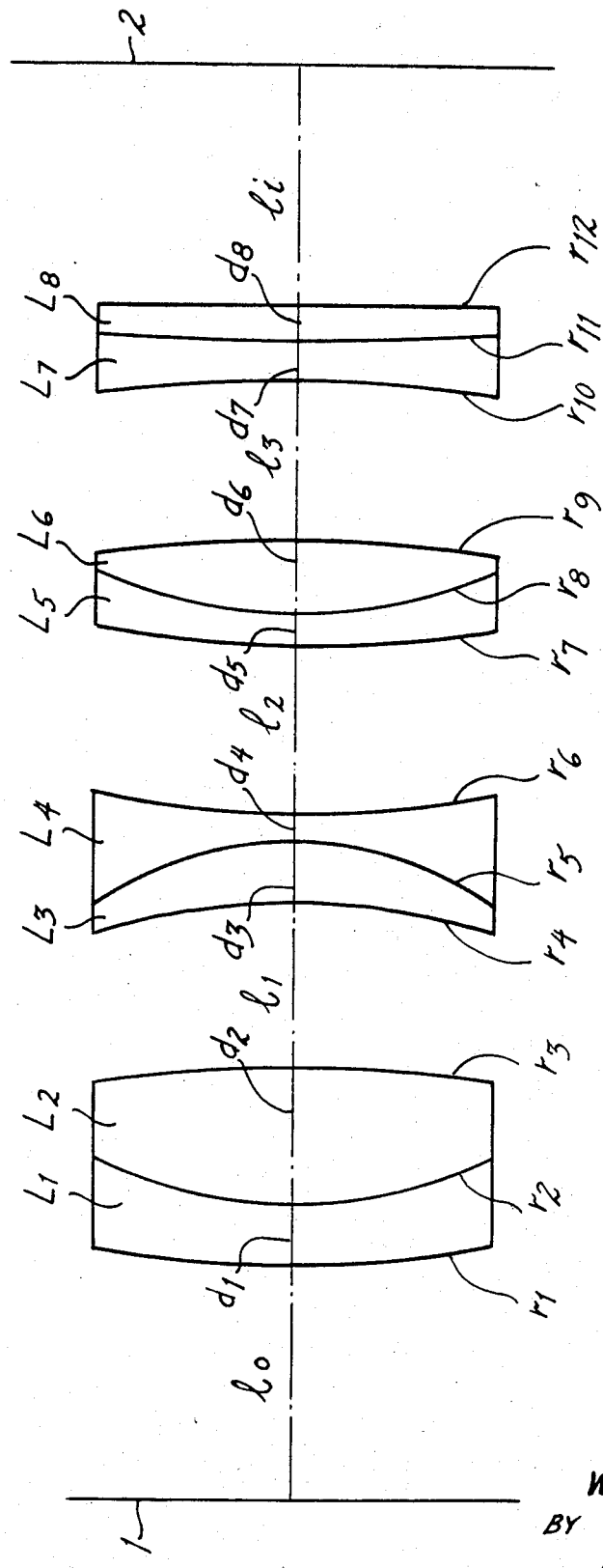

FIG. 5 illustrates an embodiment of the invention wherein each lens member is a doublet.

Referring now to the drawing, 1 designates the object plane and 2 designates the plane of the conjugate image of the object or the intermediate image projected by the four lens members $L_1$, $L_2$, $L_3$, and $L_4$ of the objective. First and fourth lens members $L_1$ and $L_4$ are fixedly mounted while the second and third lens members $L_2$ and $L_3$ are mounted for movement relative to each other by magnifying power 1, as more fully shown in FIG. 2, to change their respective magnifying powers $\beta'_2$ and $\beta'_3$.

The respective axial distance along the optical axis of the objective between the object plane 1, the four objective lens members and the conjugate image plane 2 are indicated as $l_0$, $l_1$, $l_2$, $l_3$, and $l_t$, the total axial distance between planes 1 and 2 being designated as 1.

As appears from FIGS. 4a and 4b, the diameters of the objective lens members are not too large if the pupil is positioned within the objective, i.e. in lens member $L_3$.

When such a zoom lens objective is arranged along an optical axis between an object and a conjugate image of the object projected by the system, the focal lengths of the lens members and their axial spacing preferably are determined by the parameters set forth in Table 1.

TABLE I

| | |
|---|---|
| $0.08\ 1 < f_1 < 0.25\ 1$ | $0.2\ 1 < l_0 < 0.6\ 1$ |
| | $0\quad < l_1 < 0.2\ 1$ |
| $0.05\ 1 < -f_2 < 0.2\ 1$ | |
| | $0\quad < l_2 < 0.3\ 1$ |
| $0.08\ 1 < f_3 < 0.25\ 1$ | $0\quad < l_3 < 0.2\ 1$ |
| $0.5\ \ 1 < -f_4 < 1.0\ 1$ | |
| | $0.3\ 1 < l_t < 0.7\ 1$ | wherein $f_1$, $f_2$, $f_3$, and $f_4$ are the respective focal lengths of the first, second, third, and fourth lens members.

In one specific embodiment designed for a total magnification $\beta'$ in the range of −0.63 to −2.0, the system has the values given in Tables II and III, Table III giving the axial distances or air spaces between the four objective lens members when the focal length is varied. Columns 1 to 3 in Table III indicate the air spaces when the lens members $L_2$ and $L_3$ are linearly moved in opposite directions while columns 4 to 6 in said Table III indicates these spaces when lens member $L_3$ is linearly moved while $L_2$ is moved by means of a curved cam in a known manner.

TABLE II

| | |
|---|---|
| $f_1$ | =+59.470 |
| $f_2$ | =−36.421 |
| $f_3$ | =+56.192 |
| $f_4$ | =−201.716 |
| $l_o$ | =152.090 |
| $l_i$ | =174.821 |
| $l$ | =409.997 |

TABLE III

| 1 | 2 | 3 | 4 | 5 | 6 |
|---|---|---|---|---|---|
| $l_1$ | $l_2$ | $l_3$ | $l_1$ | $l_2$ | $l_3$ |
| 9.781 | 69.612 | 3.693 | 7.658 | 71.735 | 3.693 |
| 12.556 | 63.519 | 7.011 | 12.556 | 63.519 | 7.011 |
| " | " | " | 18.436 | 52.772 | 11.878 |
| " | " | " | 23.157 | 43.185 | 16.744 |
| " | " | " | 26.996 | 34.479 | 21.611 |
| " | " | " | 30.208 | 26.401 | 26.477 |
| 32.906 | 18.836 | 31.344 | 32.906 | 18.836 | 31.344 |
| 34.756 | 14.774 | 33.556 | 33.993 | 15.537 | 33.556 |

The following Table IV gives specific data of one such zoom lens objective system with a total magnification in the range of −0.63 to −2.0, the type of glass used for the lenses also being indicated.

TABLE IV

| Radii | Axial distances or lens thickness | $n_e$ | $\gamma_e$ |
|---|---|---|---|
| $r_1 = +41.912$ | $l_o = 150.65$ | | |
| | $d_1 = 2.5$ | 1.7243 | 28.4 |
| $r_2 = +20.113$ | | | |
| | $d_2 = 5.5$ | 1.5821 | 53.6 |
| $r_3 = -81.93$ | | | |
| | $l_1 = 4.97 - 29.61$ | | |
| $r_4 = -30.839$ | | | |
| | $d_3 = 2.5$ | 1.7685 | 26.8 |
| $r_5 = -15.399$ | | | |
| | $d_4 = 1.5$ | 1.5917 | 52.9 |
| $r_6 = +42.963$ | | | |
| $r_7 = -46.007$ | | | |
| $r_8 = +22.01$ | $l_2 = 66.35 - 13.31$ | | |
| | $d_5 = 1.5$ | 1.7342 | 28.4 |
| $r_9 = -62.106$ | $d_6 = 3.0$ | 1.5749 | 57.3 |
| $r_{10} = -95.429$ | $l_3 = 3.24 - 31.64$ | | |
| $r_{11} = +150.205$ | $d_7 = 1.5$ | 1.5749 | 57.3 |
| $r_{12} = \infty$ | $d_8 = 1.5$ | 1.7343 | 28.4 |
| | $l_i = 172.80$ | | |

In this zoom lens objective system the lenses $L_1$ and $L_2$ (radii $r_1, r_2, r_3$) are cemented together. In the same manner the lenses $L_3$ and $L_4$ (radii $r_4, r_5, r_6$), the lenses $L_5$ and $L_6$ (radii $r_7, r_8, r_9$) and the lenses $L_7$ and $L_8$ (radii $r_{10}, r_{11}, r_{12}$) are cemented together respectively, the zoom lens objective system consisting of four compound lens members.

I claim:

1. A low power zoom lens system consisting of four lenses positioned along an optical axis between the object plane and the plane of the intermediate image projected by the four lenses, the first lens being biconvex and fixedly positioned nearest the object plane, the fourth lens being negative and having a first concave surface and fixedly positioned nearest the plane of the intermediate image projected by the four lenses, the second lens being biconcave and having a negative refractive power, the third lens being biconvex and having a positive refractive power, the second and third lenses being positioned intermediate the first and fourth lenses, being capable of movement along the axis relative to each other between the first and fourth lenses, these two movable lenses being so positioned relative to each other that the intermediate image of the object formed by the two lenses is always projected full scale, the absolute focal length of the second and third lenses being different from each other, the absolute focal lengths of the positive lenses being greater than the absolute focal length of the second lens and smaller than the absolute focal length of the fourth lens, the first lens and the fourth lens have an absolute magnifying power less than 1 and greater than 1.5, respectively, and the total axial distance between the object and its image remaining essentially constant.

2. The objective system of claim 1 wherein each lens is a doublet.

3. The lens system of claim 1 wherein the fourth lens is biconcave.

* * * * *